June 26, 1934.  W. S. PRITCHARD  1,964,482
WINDSHIELD OPERATING MECHANISM
Filed Jan. 19, 1931
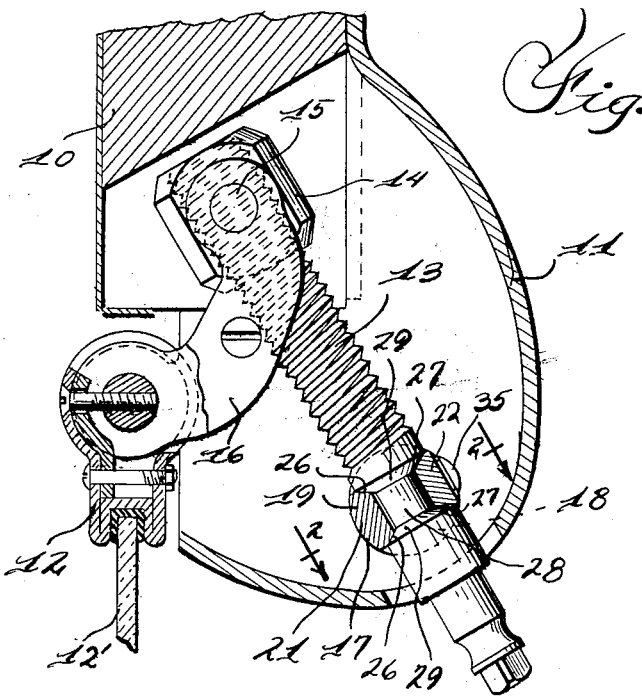
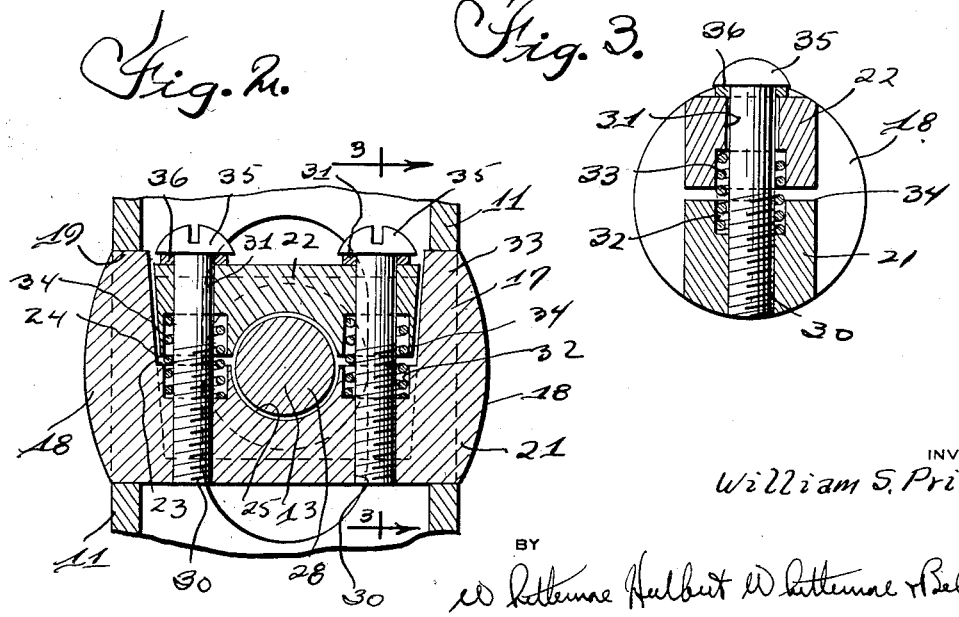
INVENTOR
William S. Pritchard
BY
ATTORNEYS Patented June 26, 1934

1,964,482

UNITED STATES PATENT OFFICE 1,964,482

WINDSHIELD OPERATING MECHANISM

William S. Pritchard, Detroit, Mich., assignor to Motor Products Corporation, Detroit, Mich., a corporation of New York Application January 19, 1931, Serial No. 509,844

3 Claims. (Cl. 308—72)

This invention relates to windshield operating mechanisms and more especially to an improvement therein, said improvement relating particularly to the trunnion bearing member for the operating shaft.

The structure forming the subject matter of this invention finds particular utility in connection with that type of windshield operating mechanism such as is illustrated in assignee's copending application, Serial No. 366,395 filed May 27, 1929.

One of the primary objects of the invention is to provide a trunnion bearing member for the operating shaft which may be quickly and economically produced without requiring extreme accuracy in dimensions; may be assembled with facility, and will provide not only a rotative bearing for the shaft but means for resisting end thrusts imparted to the shaft.

The several objects, advantages and novel details of construction will be made more apparent as this description proceeds, especially when considered in connection with the accompanying drawing, wherein Figure 1 is a vertical sectional view of a windshield operating mechanism constructed in accordance with this invention;

Figure 2 is a transverse sectional view taken substantially on the plane indicated by line 2—2 in Figure 1;

Figure 3 is a fragmentary sectional view taken substantially on the plane indicated by line 3—3 in Figure 2.

Referring now more particularly to the drawing wherein like reference characters indicate like parts, it will be noted that there is fragmentarily illustrated in Figure 1 a header 10 to which the housing or casing 11 of the operating mechanism is attached. The reference character 12 indicates the top frame of a windshield 12' which is hingedly or pivotally mounted on suitable supports adjacent its upper end.

The operating mechanism consists principally of a screw shaft 13 having a traveling nut 14 threaded thereon, this nut being provided with opposed trunnions 15 pivotally engaging the bifurcated ends of a rocker arm 16. The other end of this rocker arm 16 is rigidly connected to the frame 12 of the windshield. Thus, movement of the nut 14 along the screw shafts 13 causes a swinging movement of the windshield as will be obvious.

Screw shaft 13 is journaled in a trunnion member indicated generally by the reference character 17. This trunnion member is provided with round portions 18 at each end thereof which engage circular openings 19 in the casing 11. The trunnion member is inserted from the side of the housing through the aligned apertures 19.

This trunnion bearing member consists of a main section 21 and a cap section 22. The opposed faces 23 and 24 of the sections of the trunnion member are shaped to provide an opening 25 therebetween when the sections are assembled and the end faces of the sections are radially inclined or bevelled as indicated at 26 and 27 respectively. It will be understood that the opposed faces of the trunnion sections are provided with semi-circular recesses which together form the opening 25 and that the radially inclined surfaces 26 and 27 are likewise semi-circular in plan view.

The shaft 13 is provided with a reduced portion 28 which extends through the opening 25 and is provided with a pair of spaced opposed inclined shoulders 29 which engage the radially inclined surfaces 26 and 27 of the trunnion member. The arrangement is such that both the rotative bearing for the shaft and the end thrust bearing for the shaft are provided by the engagement of the shoulders 29 on the shaft with the surfaces 26 and 27 on the trunnion sections.

The trunnion section 21 is provided with a pair of threaded openings 30 whereas the other section is provided with a pair of openings 31 which register with the threaded openings 30. The inner face of the section 21 adjacent the threaded openings 30 is counter-bored as at 32 and the inner face of the section 22 adjacent the openings 31 is counter-bored as at 33. Springs 34 are interposed between the trunnion sections and rest with the ends in the counter-bores 32 and 33 respectively. Threaded members such as screws 35 are passed through the openings 31 and are threaded into the threaded openings 30 for securing the cap section 22 of the trunnion member to the main section 21. Lock washers 36 are preferably arranged under the heads of these threaded members.

After the shaft has been assembled with its reduced portion through the semi-circular opening of the main trunnion section 21, the cap is assembled and the threaded members 35 are screwed tight. This compresses the springs 34 and the strength of these springs is sufficient to flatten the lock washers 36. This will bind the bevelled surfaces 26 and 27 on the bevelled shoulders 29 of the shaft. The screws 35 are then backed out a part of a turn, so as to provide a running fit between the trunnion sections and the shaft. The springs 34 provide the resistance against which the threaded members may be tightened. The engagement of the bevelled or radially inclined surfaces 26 and 27 with the bevelled shoulders 29 on the shaft not only provide the rotative support for the shaft 13, but will obviously resist any longitudinal end thrusts imparted to the shaft 13. The inner faces of the trunnion sections need not be machined or accurately finished because there is no engagement between these surfaces and the periphery of the shaft.

For the above reasons the herein described construction provides an economical and facile means for supporting the screw shafts of windshield control mechanisms of this general character. The structure may obviously be assembled quickly and easily and may moreover be adjusted to compensate for wear to the parts merely by tightening the threaded members 35.

Obvious modifications will suggest themselves to those skilled in this art and to this end reservation is made to make such changes as may come within the purview of the accompanying claims.

What I claim as my invention is:

1. In a windshield operating mechanism, a shaft provided with axially spaced shoulders having the adjacent faces thereof tapered outwardly, means for mounting said shaft including a sectional trunnion member having sections disposed upon opposite sides of the shaft between the shoulders with the ends thereof tapered for engagement with the adjacent surfaces aforesaid of the shoulders and having registering recesses in the inner surfaces thereof cooperating to form an opening for the portion of the shaft between the shoulders, and means for securing the sections of the trunnion member together including yieldable means interposed therebetween normally urging the same in directions away from each other to maintain a clearance between the portion of the shaft between the shoulders and adjacent surfaces of the sections.

2. In a windshield operating mechanism, a shaft having a reduced portion and having the adjacent surfaces of the shoulders formed by the reduced portion tapered outwardly, means for mounting said shaft including a sectional trunnion member having sections disposed upon opposite sides of the reduced portion of the shaft with the ends tapered for engagement with the tapered surfaces aforesaid of the shoulders and having registering recesses in the inner surfaces thereof cooperating to form an opening for the reduced portion of the shaft, means for securing the sections in assembled relation to each other permitting relative movement of the sections toward and away from the shaft, and yieldable means interposed between the sections normally maintaining a clearance between the reduced portion of the shaft and adjacent surfaces of the sections.

3. In a windshield operating mechanism, a housing, a shaft extending into the housing provided with axially spaced shoulders having the adjacent surfaces tapered outwardly with respect to the axis of the shaft, means for supporting the shaft in the housing including a sectional trunnion member insertable through aligned openings formed in opposite side walls of the housing with the ends thereof sleeved in said openings to form closures therefor, said sectional trunnion member having a section formed with a recess in one side of sufficient dimension to receive a second section and the adjacent surfaces of both sections being recessed to form an opening for the portion of the shaft between the shoulders aforesaid thereof, the surfaces of both sections adjacent the shoulders being tapered for bearing engagement with the tapered surfaces of the shoulders, and means for securing the sections in assembled relation including yieldable means interposed between the sections normally maintaining a clearance between the portion of the shaft between the shoulders and adjacent surfaces of the sections.

WILLIAM S. PRITCHARD.